United States Patent
Larsen et al.

(10) Patent No.: US 10,438,135 B2
(45) Date of Patent: Oct. 8, 2019

(54) PERFORMANCE MODEL ADVERSE IMPACT CORRECTION

(71) Applicant: HireVue, Inc., South Jordan, UT (US)

(72) Inventors: Loren Larsen, Lindon, UT (US); Benjamin Taylor, Lehi, UT (US)

(73) Assignee: HireVue, Inc., South Jordan, UT (US)

( * ) Notice: Subject to any disclaimer, the term of this patent is extended or adjusted under 35 U.S.C. 154(b) by 496 days.

(21) Appl. No.: 15/277,769

(22) Filed: Sep. 27, 2016

(65) Prior Publication Data

US 2017/0293858 A1  Oct. 12, 2017

Related U.S. Application Data

(60) Provisional application No. 62/321,585, filed on Apr. 12, 2016.

(51) Int. Cl.
*G06N 20/00* (2019.01)
*G06Q 10/10* (2012.01)
(Continued)

(52) U.S. Cl.
CPC ............ *G06N 20/00* (2019.01); *G06N 5/022* (2013.01); *G06Q 10/1053* (2013.01); *G06Q 30/02* (2013.01)

(58) Field of Classification Search
CPC ........ G06N 20/00; G06N 5/022; G06Q 30/02; G06Q 10/1053
See application file for complete search history.

(56) References Cited

U.S. PATENT DOCUMENTS 8,351,647 B2 * 1/2013 Sharma ................. G06Q 30/02
                                                         382/103
8,751,231 B1 * 6/2014 Larsen ............... G06Q 10/1053
                                                         704/243
(Continued)

OTHER PUBLICATIONS

Buduma, N. "Data Science 101: Preventing Overfitting in Neural Networks," available at www.kdnuggets.com/2015/04/preventing-overfitting-neural-networks.html (last accessed Mar. 6, 2019). (Year: 2015).*

(Continued)

*Primary Examiner* — Kamran Afshar
*Assistant Examiner* — Ryan C Vaughn
(74) *Attorney, Agent, or Firm* — Lowenstein Sandler LLP

(57) ABSTRACT

Technology for training a predictive model is described. A processing device collects digital interview data including features identified from candidate interviews. A model training tool selects a data set of the digital interview data. The data set includes a predicted performance outcome and an actual performance outcome for each of a plurality of candidates. The model training tool determines an error metric for each of the plurality of candidates. The error metric includes a relationship between the predicted performance outcome and the actual performance outcome for each candidate. The model training tool determines a number of candidates whose digital interview data includes a feature corresponding to a protected class. The model training tool normalizes an effect of each candidate on the error metric based on the corresponding protected class and applies the normalized error metric to reduce bias in the predictive model with respect to the protected class.

20 Claims, 7 Drawing Sheets

(51) Int. Cl.
*G06N 5/02* (2006.01)
*G06Q 30/02* (2012.01)

(56) References Cited

U.S. PATENT DOCUMENTS

| | | | | |
|---|---|---|---|---|
| 9,378,486 | B2* | 6/2016 | Taylor | G06Q 10/1053 |
| 2006/0282306 | A1 | 12/2006 | Thissen-Roe | |
| 2007/0088601 | A1* | 4/2007 | Money | G06Q 10/1053 |
| | | | | 705/321 |
| 2008/0319829 | A1 | 12/2008 | Hunt et al. | |
| 2012/0078804 | A1* | 3/2012 | Scarborough | G06Q 10/1053 |
| | | | | 705/321 |
| 2012/0197816 | A1* | 8/2012 | Short | G06Q 30/0282 |
| | | | | 705/347 |
| 2012/0323891 | A1* | 12/2012 | Jacobson | G06F 16/43 |
| | | | | 707/722 |
| 2015/0371191 | A1 | 12/2015 | Taylor et al. | |

OTHER PUBLICATIONS

Morgan, D. "Statistical Significance Standards for Basic Adverse Impact Analysis." DCI Consulting Group White Paper, Jul. 2010. (Year: 2010).*
Zafar, M. et al. "Learning Fair Classifiers." arXiv preprint arXiv:15078. 05259, 2015. (Year: 2015).*
Ajunwa, I. et al. "Hiring by Algorithm: Predicting and Preventing Disparate Impact." Available at SSRN, Apr. 1, 2016. (Year: 2016).*
Leo Breiman. Random forests. Machine learning, 45(1):5{32, 2001.
Martin T Hagan, Howard B Demuth, Mark H Beale, et al. Neural network design. Pws Pub. Boston, 1996.
Marti A. Hearst, ST Dumais, E Osman, John Platt, and Bernhard Scholkopf. Support vector machines. Intelligent Systems and their Applications, IEEE, 13(4):18{28, 1998.
International Search Report and Written Opinion dated Jul. 6, 2016, on PCT Application No. PCT/US2017/026984.

* cited by examiner

PERFORMANCE MODEL ADVERSE IMPACT CORRECTION

RELATED APPLICATION

This application claims the benefit of U.S. Provisional Application No. 62/321,585, filed Apr. 12, 2016, the entire contents of which are incorporated herein by reference.

BACKGROUND

With the advent of statistical approaches used for application processing, benefits determinations, zoning, credit, voting and hiring, data objects (such as resumes, social profiles, assessments, voice, and video interview modeling) have been used to predict success. These approaches are prone to negative influence when an adverse impact exists specific to a protected class in the training set. The training set is the selection of data that is used for the computer to learn which features are most important for predicting performance. For example, if minority sales professionals are given less than ideal sales regions compared to their majority counterparts, an adverse impact may exist in the performance training set. This impact, if untreated, could be mimicked in the final model that was trained on this performance data.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
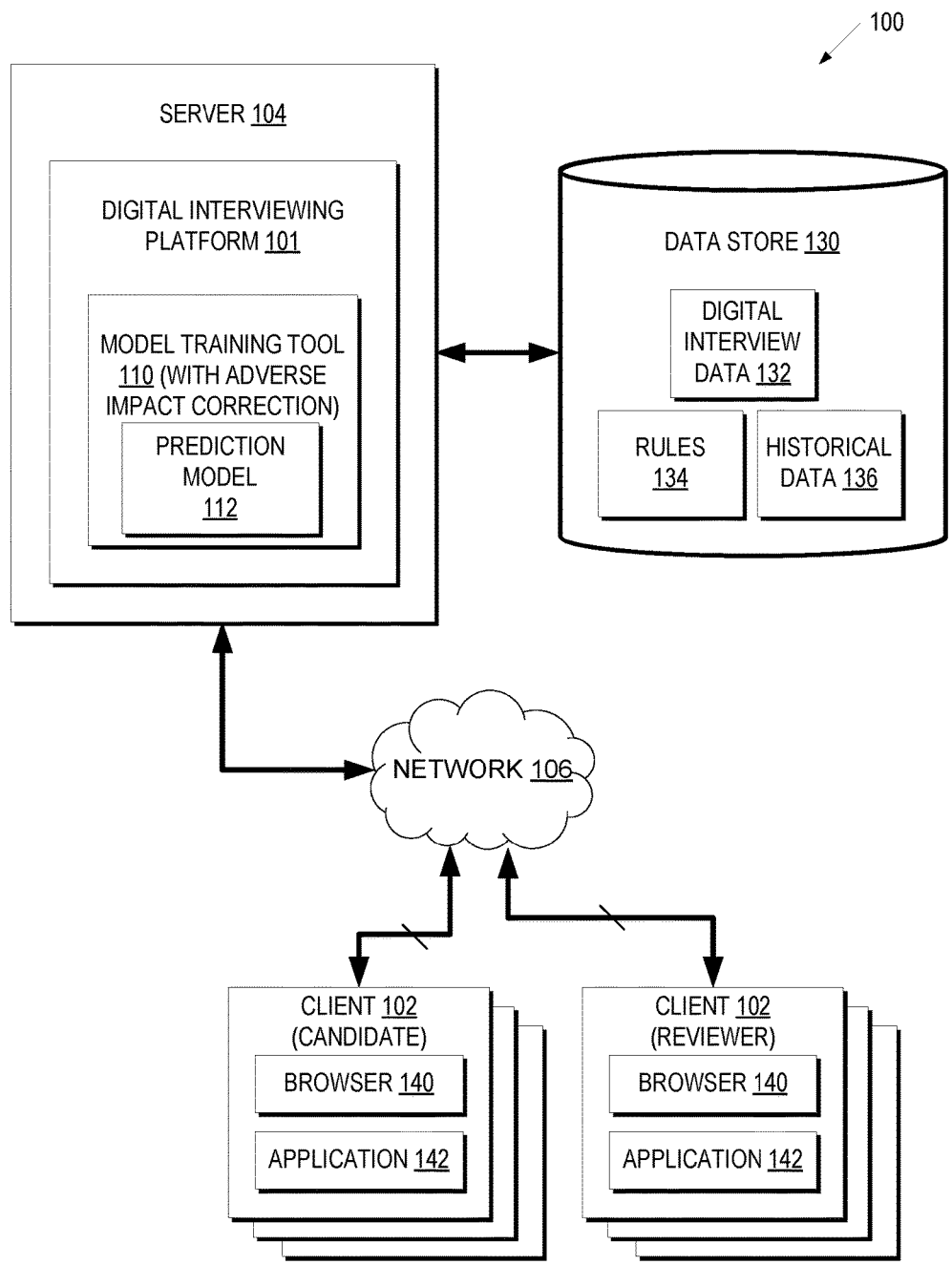
FIG. 1 is a block diagram of an exemplary network architecture in which embodiments of a model training tool may operate.

Methods and systems for correcting adverse impact in training a predictive performance model for candidate prediction are described. In the following description, numerous details are set forth. The predictive performance model can be used in digital interviewing platforms, as well as other digital evaluation platforms.

In one embodiment, a digital interviewing platform collects digital interview data. The data may include features, or model inputs. Examples of features include information submitted by the candidate, audio information recorded during a digital interview, visual information recorded during a digital interview, or other information relating to the candidate. The digital interview data can be processed by machines to extract characteristics of candidates. For example, machine-learning may be applied to audio and/or video information provided in the digital interview data to identify indicators of characteristics of a candidates, such as age, race, ethnicity, religion, gender, sexual orientation, disability, socio-economic status of the candidate or familial socio-economic status, citizenship status, association with institutions such as schools, charities, political organizations, or the like. The digital interview data may also include data relating to a result of the interview. For example, the data may include whether or not the candidate was hired for the position, how the candidate performed in the position with regard to sales, funding, development, patents, hours, revenue, etc. These and other candidate-related data may be stored to a data store.

The model training tool may select a data set including some or all of the digital interview data stored in the data store. Alternatively, the data set can be stored in the data store according to hiring campaign or other organizational criteria. The model training tool may execute one or more algorithms to reduce adverse impact in the data set. In some data sets, adverse impact may be introduced intentionally or unintentionally. For example, a decision-maker in the hiring process may introduce a personal bias into the hiring process by favoring graduates from one institution over another or based on other criteria or features of candidates within a candidate pool. Alternatively, the adverse impact may be introduced sub-consciously. Adverse impact can also be caused by flaws in a system, metrics used by a company in previous rounds of evaluations of candidates. This adverse impact may be difficult to detect and remove from a system and the effects may be difficult to counteract or correct. Moreover, the adverse impacts can affect many fields, for example, education (admissions and scholarship), housing, benefits and services, healthcare services, land use, zoning, lending and credit, transportation, voting, etc. The embodiments described herein help to correct adverse impacts in these and other situations.

In one embodiment, the model training tool may train a predictive model to provide predictive performance metrics for new candidates. In order to correct adverse impacts that may be present in the historical digital interview data used to train the model, the model training tool may execute an objective function to identify an error metric with a normalizing feature. The error metric represents a difference between an actual performance value of a candidate and a corresponding predicted performance value for the candidate. The actual performance value can also be referred to as a true performance value, or an actual performance metric. For example, during the hiring process a predicted value for sales may be generated by the predictive model. After hiring, and with sufficient data, an actual performance value for the candidate may be generated with regard to sales. The model training tool may determine the difference between the actual value and predicted value. The difference between the two may be applied to further train the model to improve the accuracy of subsequent predictions. However, if adverse impact, caused by conscious or subconscious bias by an evaluator, was involved in the evaluation process, the adverse impact will be trained into the model if undetected. A candidate majority may exist within the data set which may control the error metric. In one example, if the majority of candidates are male, the data sets for the male candidates may then impact the error analysis. This may create an adverse impact against female candidates. For this reason, application of a normalizing process, such as a weighting factor algorithm, or removing features, is added to process for determining the error metric. The normalizing process may normalize the effect of the data for each type or class of candidate so that each class has an equal effect on the model. This may reduce or eliminate adverse impact based on a class, such as age, gender, race, or the like, by giving each candidate class equal weight. Other classes, such as income-based, performance-based, and other categories defined or not defined by law, may be utilized. The resulting data set can then be used to train the model for better accuracy in prediction without incorporating the adverse impact that may be present in the original data set. In some examples, a normalized data set may be created and a corrected data set created from the normalized data. In some examples, the original data set may be maintained or modified from the original state by normalizing or dropping features.

Previous methods of handling adverse impact present in a data set could identify adverse impact but could not correct for it without modifying available features, such as editing or dropping entire aspects from the data set. The training set is the selection of data that is used for the computer to learn which features are most important for predicting performance. As described above, if bias is already in the performance training set, the bias will be mimicked in the final performance prediction model, if uncorrected. One previous solution for addressing detected adverse impact involved removal and/or de-meaning techniques which would eliminate or discount aspects such as a performance metric, applicant data obtained during an interview, historical data such as education, etc. Previous approaches were also unable to handle unstructured data types, such as audio, video, or text, without forcing that data into a tabular format. These predictive models required tabular data such as a spreadsheet or database entries. Previous approaches could not contemplate, for example, a raw audio stream which may have over one million data points. Isolating a specific feature would be difficult if not impossible under previous approaches.

The examples described herein do not require data modification or elimination of features and are, additionally, able to manage unstructured data. Previous methods did not address preventing adverse impact in more advanced unsupervised learning techniques such as deep learning. The embodiments described herein can use machine-learning techniques to process the data. In particular, learning techniques such as deep learning are able to manage vast quantities of data points without relying on a traditional learning approach. The ability to handle larger data sets allows the modeling technique to use more features, as well as features which are more complex (as in the case of deep learning based on audio/image/video), without concern for adverse impact contributions. The techniques described herein also may prevent adverse impact when such an impact is present in training data as well as reduction of even minor adverse impacts. Further reduction of adverse impacts may lower detected impacts to levels already below applicable legal thresholds such as the "⅘ths rule," the "statistical significance rule," or tests such as the Fisher's exact test, the Z-Test for proportions, a chi-squared test, or the like.

FIG. 1 is a block diagram of an example of a network architecture 100 in which embodiment of a model training tool 110 may operate. The illustrated network architecture 100 may include multiple client computing systems 102 coupled to a server computing system 104 via a network 106 (e.g., public network such as the Internet or private network such as a Local Area Network (LAN)). The network 106 may include the Internet and network connections to the Internet. Alternatively, server 104 and the client 102 may be located on a common LAN, Personal Area Network (PAN), Campus Area Network (CAN), Metropolitan Area Network (MAN), Wide Area Network (WAN), Wireless Local Area Network (WLAN), a cellular network, Virtual Local Area Network (VLAN), or the like. The server computing system 104 (also referred to herein as server 104) may include one or more machines (e.g., one or more server computer systems, routers, gateways) that have processing and storage capabilities to provide the functionality described herein. The server computing system 104 may execute a model training tool 110. The model training tool 110 can perform various functions as described herein and may include a prediction model 112 for predicting values for candidates. The model training tool 110 can be implemented as a part of a digital interviewing platform 101, such as the digital interviewing platform developed by HireVue, Inc. Alternatively, the digital interview platform 101 may be other types of digital interview platforms. In other embodiments, the technology described herein may be used in other digital evaluation platforms or systems. In other embodiments, the model training tool 110 can be implemented as a standalone tool that interfaces with the digital interviewing platform 101 or other systems. It should also be noted that in this embodiment, the server computing system 104 implements the model training tool 110, but one or more of other clients may also include client modules of the model training tool 110 that can work in connection with, or independently from the functionality of the model training tool 110 on the server computing system 104.

The client computing systems 102 (also referred to herein as "client 102") may be a client workstation, a server, a computer, a portable electronic device, an entertainment system configured to communicate over a network, such as a set-top box, a digital receiver, a digital television, a mobile phone, a smart phone, a tablet, or other electronic devices. For example, portable electronic devices may include, but are not limited to, cellular phones, portable gaming systems, portable computing devices or the like. The client 102 may have access to the Internet via a firewall, a router or other packet switching devices. The clients 102 may connect to the server 104 through one or more intervening devices, such as routers, gateways, or other devices. The clients 102 are variously configured with different functionality and may include a browser 140 and one or more applications 142. In one embodiment, the clients 102 access the digital interviewing platform 101 via the browser 140 and the digital interviewing platform 101 is a web-based application or a cloud computing system that presents user interfaces to the client 102 via the browser 140. Similarly, one of the applications 142 can be used to access the digital interviewing platform 101. For example, a mobile application (referred to as "app") can be used to access one or more user interfaces of the digital interviewing platform 101. The digital interviewing platform 101 can be one or more software products that facilitate the digital interview process. For example, in some cases, the client 102 is used by a candidate (or interviewee) to conduct a digital interview. The digital interviewing platform 101 can capture digital interview data 132 from the candidate and store the data in a data store 130. The digital interview data 132 can include information uploaded by the candidate, audio information captured during the interview, video information captured during the interview, information submitted by the candidate before or after the interview, and data collected for the candidate after hiring. The client 102 can also be used by a reviewer or evaluator to review, screen and select candidates. The reviewer can access the digital interviewing platform 101 via the browser 140 or the application 142 as described above. The model training tool 110 can be activated by the reviewer (or automatically activated when enabled) to upload performance data for a candidate, train the prediction model 112 to sort candidates, for ordering a list of candidates using the prediction model 112, screening a list of candidates, or for other reviewing purposes, as described herein.

The data store 130 can represent one or more data repositories on one or more memory devices. The data store 130 may be a database or any other organized collection of data. The data store 130 may store the digital interview data 132, rules 134 to provide adverse impact correction (as described herein), and historical data 136.

In the depicted embodiment, the server computing system 104 may include the digital interviewing platform 101, including the model training tool 110 and prediction model 112 for reducing adverse impact in the digital interviewing platform 101. The server 104 can include web server functionality that facilitates communication between the clients 102 and the model training tool 110, as described herein. Alternatively, the web server functionality may be implemented on a separate machine than the machine executing the model training tool 110. It should also be noted that the functionality of the model training tool 110 can be implemented on one or more servers 104 and the functionality of the model training tool 110 can be implemented on one or more different servers 104. In other embodiments, the network architecture 100 may include other devices, such as directory servers, website servers, statistic servers, devices of a network infrastructure operator (e.g., an ISP), or the like. Alternatively, other configurations are possible as would be appreciated by one of ordinary skill in the art having the benefit of this disclosure.

Figure 2:
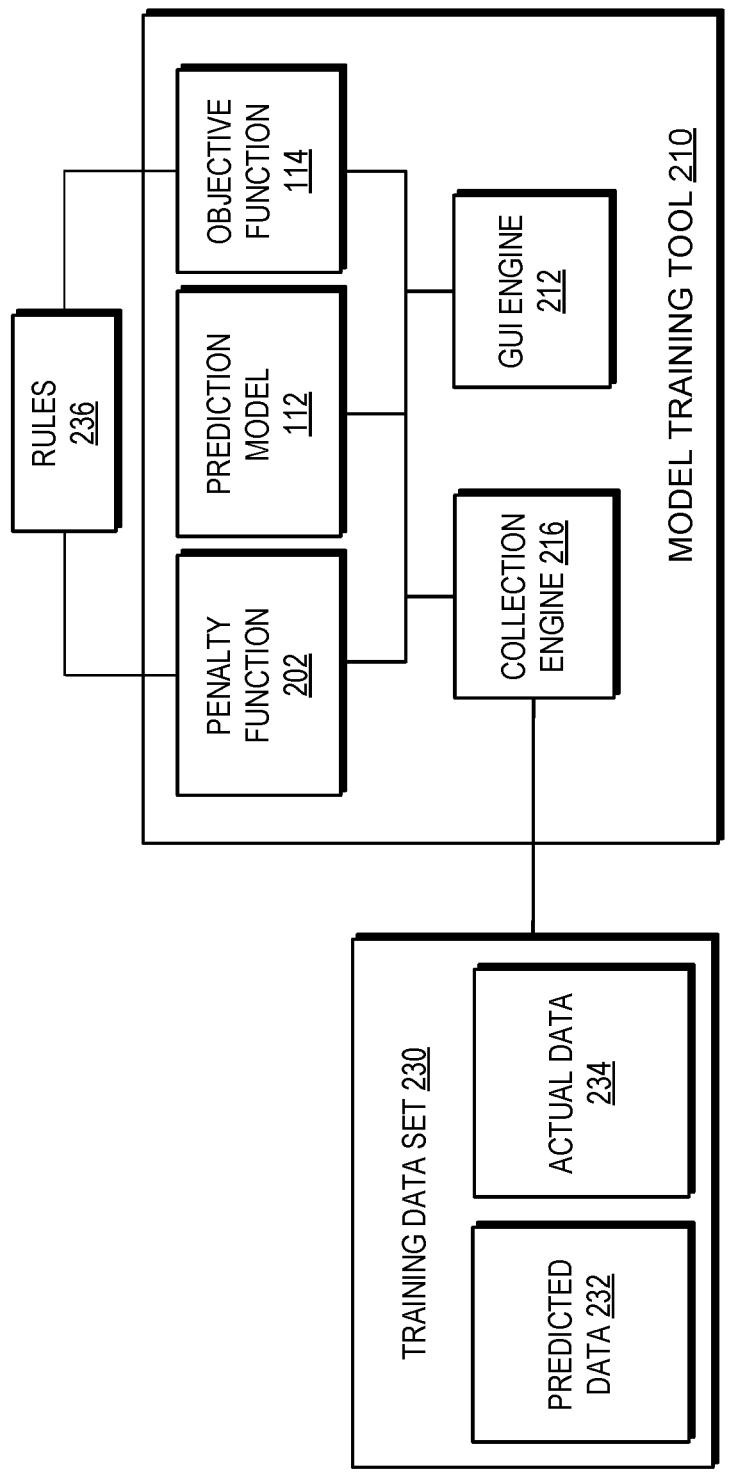
FIG. 2 is a block diagram of a model training tool according to one embodiment.

FIG. 2 is a block diagram of a model training tool 210 according to one embodiment. The model training tool 210 can be implemented as processing logic comprising hardware (circuitry, dedicated logic, etc.), software (such as is run on a general purpose computing system or a dedicated machine), firmware (embedded software), or any combination thereof. In the depicted embodiment, the model training tool 210 includes a penalty function 202, the prediction model 112, an objective function 114, a graphical user interface (GUI) engine 212, and a collection engine 216. The components of the model training tool 210 may represent modules that can be combined together or separated into further modules, according to some embodiments. The model training tool 210 may include more or fewer components than those depicted in FIG. 2.

Before the model training tool 210 is used to perform any given round of training on the prediction model 112, the collection engine 216 may collect data from the training data set 230. The data set 230 may include predicted data 232 and actual performance data 234. The predicted data 232 may be data that was generated for a candidate in an effort to predict a performance value for the candidate. The actual performance data 234 may include data that was generated for the candidate after hiring and establishing a record of the candidate's actual performance after hiring from which an actual performance value may be obtained. The collection engine 216 may collect the predicted data 232 separate from the actual performance data 234 or may collect the predicted data 232 and the corresponding actual performance data 234 in approximately the same action. The training data set 230 may also be a corrected data set as described herein. The collection engine 216 may provide the training data set 230 to the objective function 114. The collection engine 216 may also provide the training data set 230 to the penalty function 202. In some embodiments, the objective function 114 and the penalty function 202 may also access one or more rules 236. The rules 236 may be stored in a data store 130 external to the model training tool 210, as illustrated in FIG. 1, or local to the model training tool 210. The rules 236 may include conditions such as a requirement to meet the four-fifths (⅘ths) rule or a definition of the "statistical significance" rule. The rules 236 can be input by a user, such as an administrator of the module training tool 210.

The model training tool 210 may identify different features from the training data set 230. The features may include audio features, video features, image features, an interaction feature, or a candidate submitted feature. The model training tool 210 may communicate the training data set 230 to the objective function 114. For example, model training tool 210 can utilize facial recognition techniques to identify visual indicators of a candidate, such as Active Appearance Model (AAM) or other computer vision algorithms to model a face of the candidate. The model training tool 210 can identify other types of features than facial in the training data set, such as other visual indicators, audio indicators, or the like.

The objective function 114 may apply a learning scheme to the supplied data set 230. In some embodiments, the learning scheme may be a deep learning scheme, a regression approach, a vector machine, genetic programming, or other supervised or unsupervised machine learning scheme.

In one embodiment, the objective function 114 may include a sum of squared errors (SSE) algorithm. Mathematically, the SSE can be expressed as:

$$SSE = \Sigma_{i=1}^{N} e_i^2 \Sigma_{i=1}^{N} (y_p - y_t)^2 \qquad (1)$$

where $e_i$ is defined as the difference between the predicted performance outcome values $y_p$ and actual performance outcome values $y_t$. The values in $y_p$ can be produced using:

$$y_p = f(x) \qquad (2)$$

where f represents a function or algorithm used to process input features, x, such as text, audio, video, assessment results, competency scoring, candidate response, etc. However, as described above, the processed input features such as the assessment results or competency scoring may be impacted by a bias relating to a protected class of the candidates within the training data set 230.

Correcting the adverse impact of one or more class-specific biases can be accomplished by dividing the objective function inputs into equal representations relative to the classification (race, gender, age, etc.). Without correction, the majority candidates may dominate the error metric in the above SSE. In order to prevent a majority class from defining or controlling the SSE, and therefore providing the majority model influence, the objective function 114 is redefined, in examples described herein, to be broken out by each protected class. The original SSE definition shown above is replaced with a more granular summary defined by:

$$SSE_{corrected} = \sum_{i=1}^{A} \frac{e_i^2}{A} + \sum_{i=1}^{B} \frac{e_i^2}{B} + \sum_{i=1}^{C} \frac{e_i^2}{C} + \ldots \qquad (3)$$

where each candidate class is broken out and normalized by total class candidate count. Variables A, B, and C represent total counts for a particular class, such as a particular race (i.e. black, white, Hispanic, etc.), gender, or age group. This allows each candidate class to influence the model with equal weight on the objective, ensuring that the majority class does not dominate the impact on training the model to the detriment of an underrepresented or minority class within the training data set 230.

In the illustrated embodiment shown in FIG. 2, the model training tool 210 also includes a penalty function 202. The penalty function 202 can be incorporated to further reduce adverse impact on the predictive model 112 or to check for or remedy a specific adverse impact situation. One example of the objective function 114 with a penalty function included may be defined by:

$$SSE_{with\text{-}penalty} = SSE_{corrected} + P(X) \quad (4)$$

Here, the penalty function P(X) is not explicitly defined because it can vary based on rules and regulation for regions over time. An example of a penalty function is the 4/5ths rule and is represented as follows:

$$P(X) = \begin{cases} p_m, & \text{if } f(X) \text{ violates } 4/5ths \text{ rule} \\ 0, & \text{otherwise} \end{cases} \quad (5)$$

where an appropriate penalty, $p_m$, can be used to adjust the original error metric if an adverse impact is detected during the model training phase. In the above penalty function, the 4/5ths rule is applied. In this example, if any class of candidates has a hiring rate that is less than 80% of the top class hiring rate, the 4/5ths rule is violated and a penalty value, $p_m$, can be incorporated into the objective equation 114.

Other rules, such as the "statistical significance" rule, may also be used. The statistical significance rule can define other thresholds of discrepancy at which a penalty value may be incorporated. Other thresholds and rules can be applied as situations arise or legal or entity standards change. In some embodiments, multiple penalty functions 202 may be applied to the objective function 114.

The penalty $p_m$ magnitude can be defined depending on the priority of the violation. If the violation can't be tolerated, then $p_m$ can be quite large (such as a value of 100, 1000, or even infinite). When a middle ground is possible, a smaller $p_m$ value will still allow for violation consideration without impacting a prediction performance as much as a large $p_m$ value might.

There are many different error metrics depending on the use case. This approach offers value regardless of the error metric that is used. The original $SSE_{corrected}$ in equation (3) can be rewritten in the general format of:

$$E_{corrected} = E_A + E_B + E_C + \ldots \quad (6)$$

where E represents the error term of interest and $E_A$ represents only the normalized error for candidate class A. here, E can be redefined for many different error types.

When:

$$E_A = \sum_{i=1}^{A} \frac{e_i^2}{A}, \quad (7)$$

the original expression from the $SSE_{corrected}$ equation is returned.

If E is redefined as using a Mean Absolute Error (MAE) as in equation (8) below, where:

$$E_A = 1/A \sum_{i=1}^{A} |y_p - y_t| \quad (8)$$

the objective function 114 changes and the training of the model may be adjusted.

Another objective function example could include Logarithmic Loss or "LogLoss" defined by:

$$E_A = -\frac{1}{A} \sum_{i=1}^{A} |y_t \log(y_p) + (1 - y_t) \log(1 - y_p)|. \quad (9)$$

Many different objective functions exist other than those set forth in equations (1)-(9), such as area under a receiver operating characteristics (ROC) curve (AUC), root mean square (RMSE), Nash-Sutcliff efficiency (NSE), Chi-squared, or the like. The general approach includes defining any objective function, such as a cost or loss function, where the contribution is normalized between candidate classifications with the potential for a penalty to be incorporated to address specific situations. While certain examples are described herein, the approach discussed can incorporate any number of algorithms or functions to predict and evaluate performance prediction. Possible algorithms include support vector machines, deep neural networks, various regressions, decision trees, and supervised learning variants. This allows for a number of advantages.

For example, previous approaches to address bias in a training data set may include manually adjusting a candidate GPA to assist minority candidates. However, this approach may be seen as controversial where majority class candidates may contend the approach is an unfair discrimination against their in-school performance. A better approach may be to remove the feature completely, or leave the raw features alone, and focusing on the best objective for the problem protects against this concern.

In another example, previously suspect features that were not well understood were risky considerations. For example, the suspect features may be complex modeling techniques with feature creation techniques or metrics unrelated to performance. In the examples described herein, more aggressive deep learning approaches can be applied to audio, video, image, and other feature sources to predict performance without mimicking or incorporating adverse impact. Also, companies which may not have performance data can use pre-performance data such as interview screening status, hiring status (offer/no offer), or other metrics previously considered too risky.

Returning to FIG. 2, the model training tool 210 may incorporate the above described objective function 114 and the penalty function 202 to train the prediction model 112. Once trained, the candidates can be sorted and displayed to a reviewer via the GUI engine 212. The GUI engine 212 can create a GUI with input mechanisms to review the training data set 230, the set of rules 236 for the model training tool 210, constraints or parameters on the prediction model 112, the penalty function 202 or the objective function 114, the collection engine 216, or other aspects of the model training tool 210. The GUI engine 212 can also create other user interface mechanisms to facilitate selection of rules, modification of rules, categories, data item properties, or the like. The GUI engine 212 can also provide a visual representation of the data to display to the administrator. In some embodiments, the GUI engine 212 is used when displaying the GUI on the same device in which the model training tool 210 is implemented. In another embodiment, the GUI engine 212 can be used in connection with a web server that creates and displays a webpage to be sent to another device for display. The GUI engine 212 can also generate a GUI for reviewers within the digital interviewing platform 101, such as when viewing a list of potential candidates. For example, the reviewer can view the list of candidates and activate a user interface element to activate a sorting that sorts the candidates. The GUI engine 212 then presents the sorted list of candidates by performance values predicted by the prediction model 112.

The embodiments of the candidate-sorting tool 210 can use data from a new candidate interview as inputs to the prediction model 112 for predicting a performance value of the new candidate.

Figure 3:
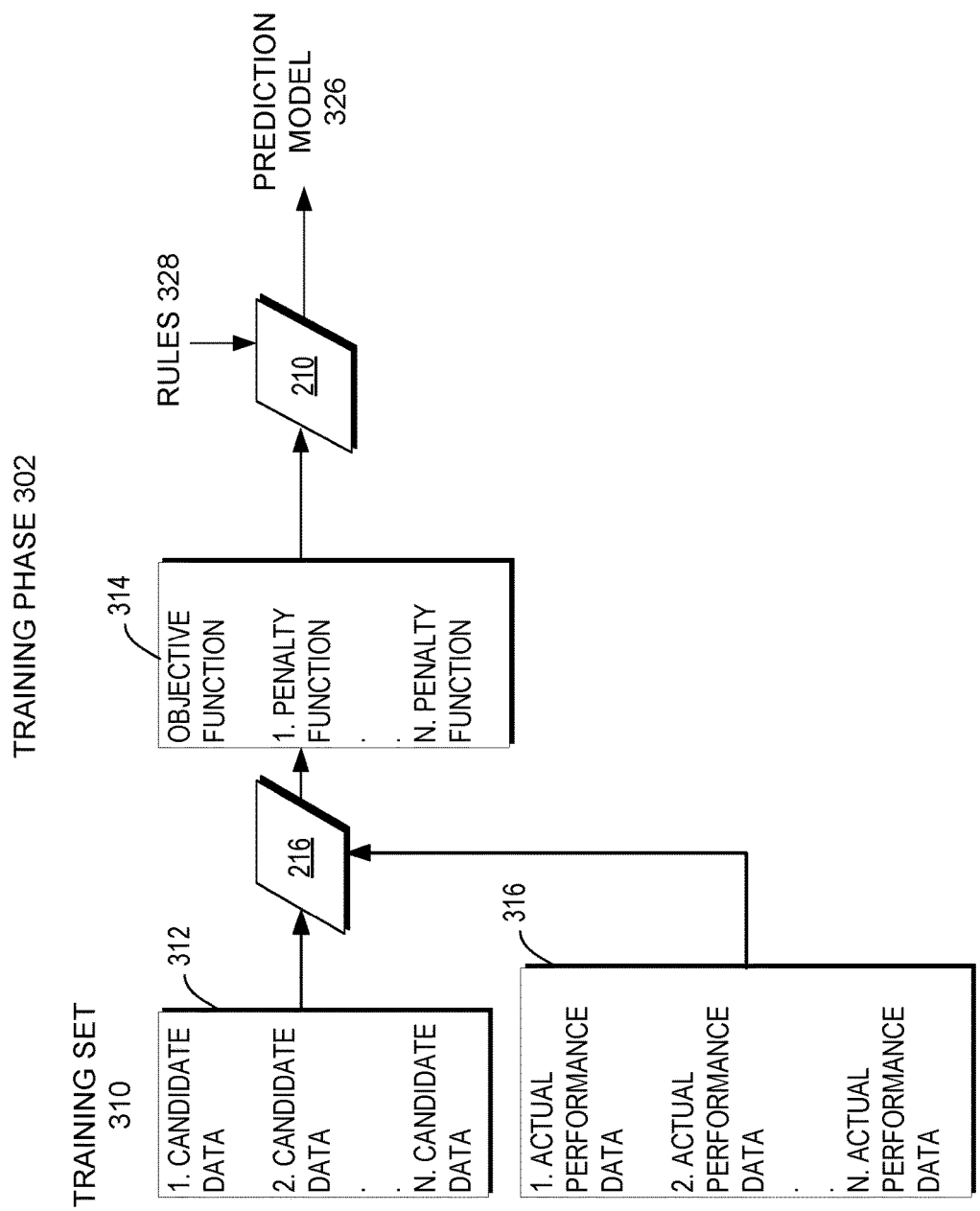
FIG. 3 illustrates a training phase of a model training tool to build a prediction model according to one embodiment.

FIG. 3 illustrates a training phase 302 of a model training tool 210 to build a prediction model 326. During the training phase 302, a training data set 310 is identified. The training data set includes candidate data 312 for multiple candidates. The candidate data may include audio files, video files, or other data files with information about candidates, as well as audio and/or video from the interview itself. The candidate data 312 can be captured by the digital interviewing platform 101 described herein. Alternatively, the candidate data 312 can be obtained from various sources as described herein. The candidate data 312 and performance data 316 of the training data set 310 is collected by the collection engine 216. The training set 310 can be organized in columns of a matrix, where each row represents a candidate and the columns store the features corresponding to the candidate. The training data set 310 can also include historical data 316 for the respective candidates. As described herein, the historical actual performance data 316 can be stored with the candidate data 312 or separate from the candidate data 312. Both the candidate data 312 and the performance data 316 are collected by the collection engine 216 and fed into the functions (objective and penalty) which provide values to the model training tool 210 to develop a prediction model 326. The model training tool 210 can be governed by rules 328. The rules may be input by an administrator responsible for building the prediction model 326. The rules 328 can include a set of training rules for an algorithm that builds the prediction model 326 based on the values from the functions 314 operating on the training set 310. Once the prediction model 326 is developed, it can be further trained by testing additional data in the training set 310. This can allow the administrator to adjust the set of rules 238 of the algorithm being used as well as the objective and penalty functions 314. Alternatively, the techniques described herein can be used for non-protected classes and can use unsupervised learning to build the predictive performance model.

Figure 4:
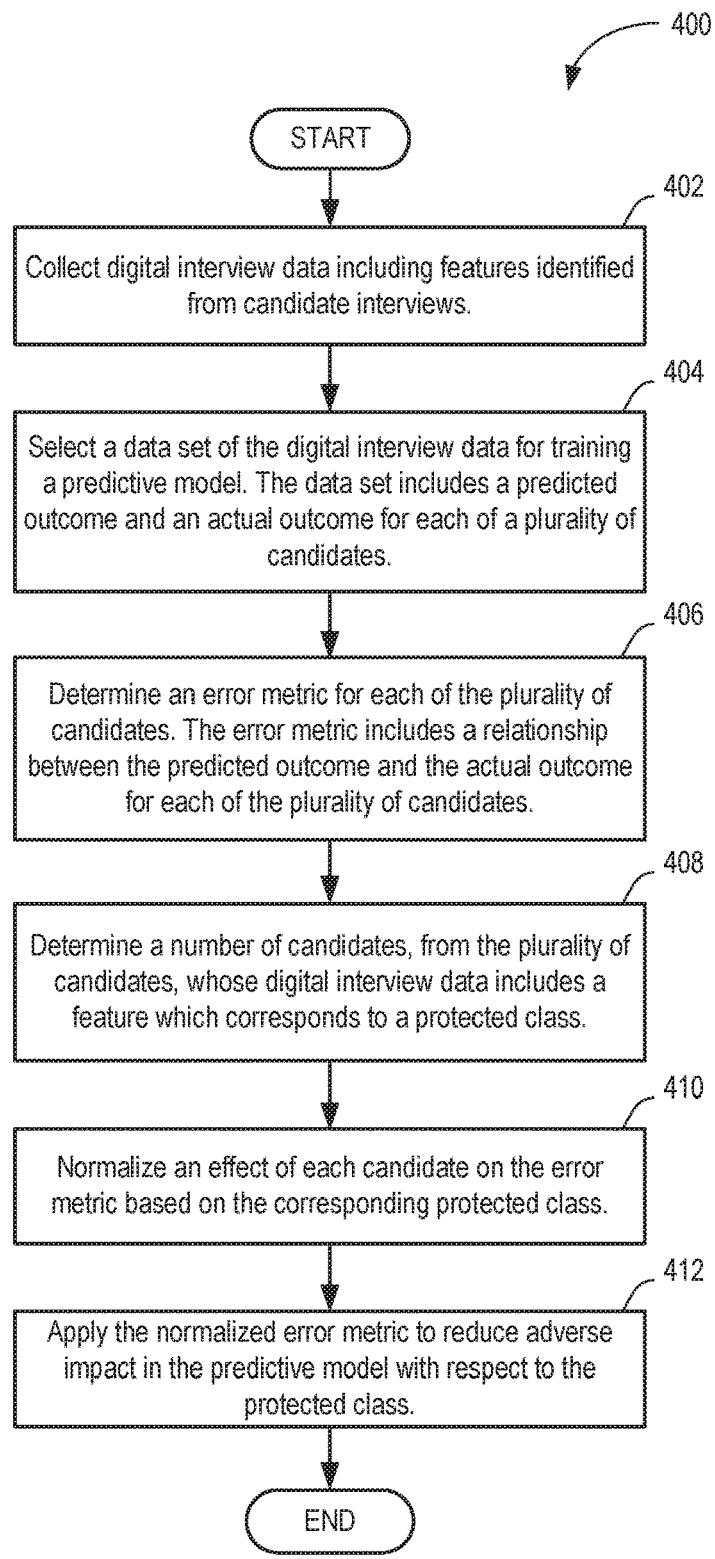
FIG. 4 is a flow diagram of a method for training a predictive model according to one embodiment.

FIG. 4 is a flow diagram of a method 400 for training a predictive model according to one embodiment. The method 400 can be performed by processing logic comprising hardware (circuitry, dedicated logic, etc.), software (such as is run on a general purpose computing system or a dedicated machine), firmware (embedded software), or any combination thereof. In one embodiment, the processing logic of the model training tool 110 of FIG. 1 performs the method 400. In another embodiment, the processing logic of model training tool 210 of FIG. 2 performs the method 400. Alternatively, processing logic of server 104, client 102, or both performs some or all of the method 400.

At block 402, processing logic may collect digital interview data including features identified from candidate interviews. The collection of the digital interview data may include may include audio, video, image, or other data captured during a digital interview. Additionally, the interview data may include data submitted by the candidate before, during, or after the interview. The data may also include information harvested or obtained from other sources such as social media pages, public or private listings, or other sources of information relating to the candidate. The data may also include information relating to a performance of the candidate. The performance of the candidate may be relative to a reviewer's response to the candidate's interview, a hiring decision, a performance metric on the job, or other non-predicted values. Other information may also be collected as described herein.

At block 404, the processing logic, such as the collection engine 216 selects a data set of the digital interview data for training a predictive model. The selected data set includes a predicted performance outcome and an actual performance outcome for each of a plurality of candidates. In some embodiments, the data set may be selected based on a time frame, a hiring campaign, a type of position for which candidates applied, a characteristic of the candidate, or some other variable.

At block 406, the processing logic may determine an error metric for each of the candidates. The error metric may include a relationship between the predicted performance outcome and the actual performance outcome for each of the plurality of candidates. As described above, the error metric may be generated by an objective function. The relationship between the outcomes (predicted and actual) may be determined using a cost, loss, or other objective function as described herein.

At block 408, the processing logic may determine a number of candidates, from the plurality of candidates, whose digital interview data includes a feature which corresponds to a protected class. In some embodiments, the collection engine 216, the model training tool 210, or some other component of the system may analyze the digital interview data to determine if the candidate qualifies as a member of a protected class. The candidate may be determined to be a member of a protected class based on a designation on an application, an answer to a question, a visual characteristic, an audio characteristic, or some other piece of information contained in the digital interview data or elsewhere. Alternatively, the candidate may not be a member of the protected class, but is categorized based on other characteristics that bias impacts.

At block 410, the processing logic may normalize an effect of each feature and candidate on the error metric based on the corresponding protected class. Normalizing the effect may include taking an adverse impact of a member of class by dividing the error metric for the particular class by the number of candidates who qualify for the class. This will normalize the impact of the candidates such that the error metric for each class will have equal impact on the predictive model. Normalizing the effect of the error metric by classes may be achieved by processes other than dividing the error metric.

At block 412, the processing may apply the normalized error metric to reduce adverse impacts in the predictive model with respect to the protected class by directing the model or dropping features as described herein. With the error metric normalized by protected classes, the model training tool 210 may train the model without introducing, maintaining, or exacerbating adverse impact with respect to one or more protected classes. In this manner, a company or other entity may prevent or remedy situations in which liability for bias may be a concern. In other embodiments, the model training tool 210 can use the techniques described herein in connection with classes that are not necessarily protected by law.

Figure 5:
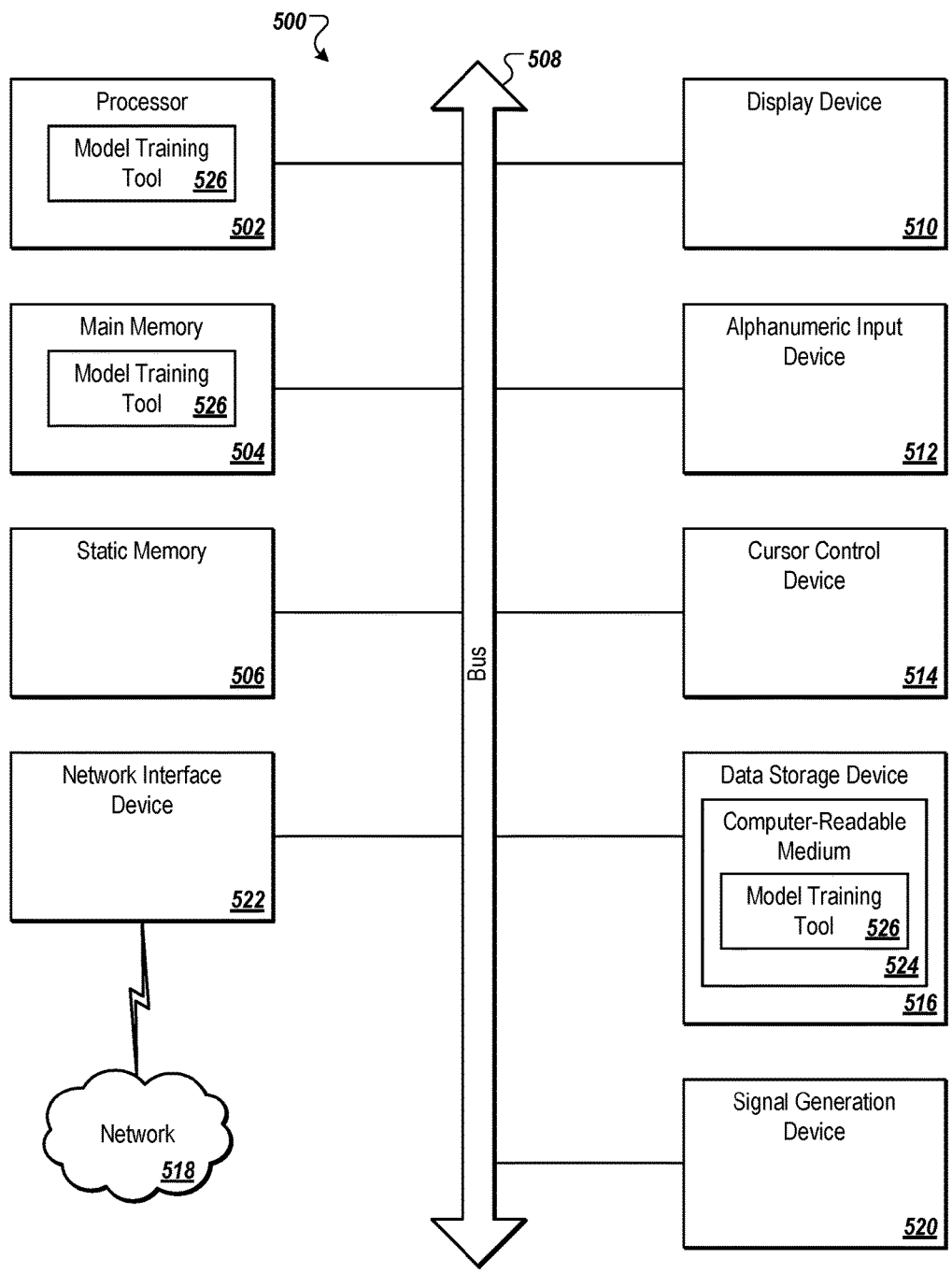
FIG. 5 illustrates a diagrammatic representation of a machine in the example form of a computing system for training a predictive model.

FIG. 5 illustrates a diagrammatic representation of a machine in the example form of a computing system 500 for training a predictive model. Within the computing system 500 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for a model training tool for evaluating digital interviews and the like, such as the method 400 described above. In one embodiment, the computing system 500 represents various components that may be implemented in the server computing system 104 as described above. Alternatively, the server computing system 104 may include more or fewer components as illustrated in the computing system 500.

The exemplary computing system 500 includes a processing device 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 516, each of which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic or instructions (e.g., model training tool 526) for performing the operations and steps discussed herein.

The computing system 500 may further include a network interface device 522. The computing system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable storage medium 524 on which is stored one or more sets of instructions (e.g., model training tool 526) embodying any one or more of the methodologies or functions described herein. The model training tool 526 may also reside, completely or at least partially, within the main memory 504 and/or within the processing device 502 during execution thereof by the computing system 500, the main memory 504 and the processing device 502 also constituting computer-readable storage media. The model training tool 526 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The model training tool 526, components, and other features described herein can be implemented as discrete hardware components or integrated in the functionality of hardware components such as ASICS, FPGAs, DSPs, or similar devices. The model training tool 526 may implement operations of performance model adverse impact correction as described herein. In addition, the model training tool 526 can be implemented as firmware or functional circuitry within hardware devices. Further, the model training tool 526 can be implemented in any combination of hardware devices and software components.

Figure 6:
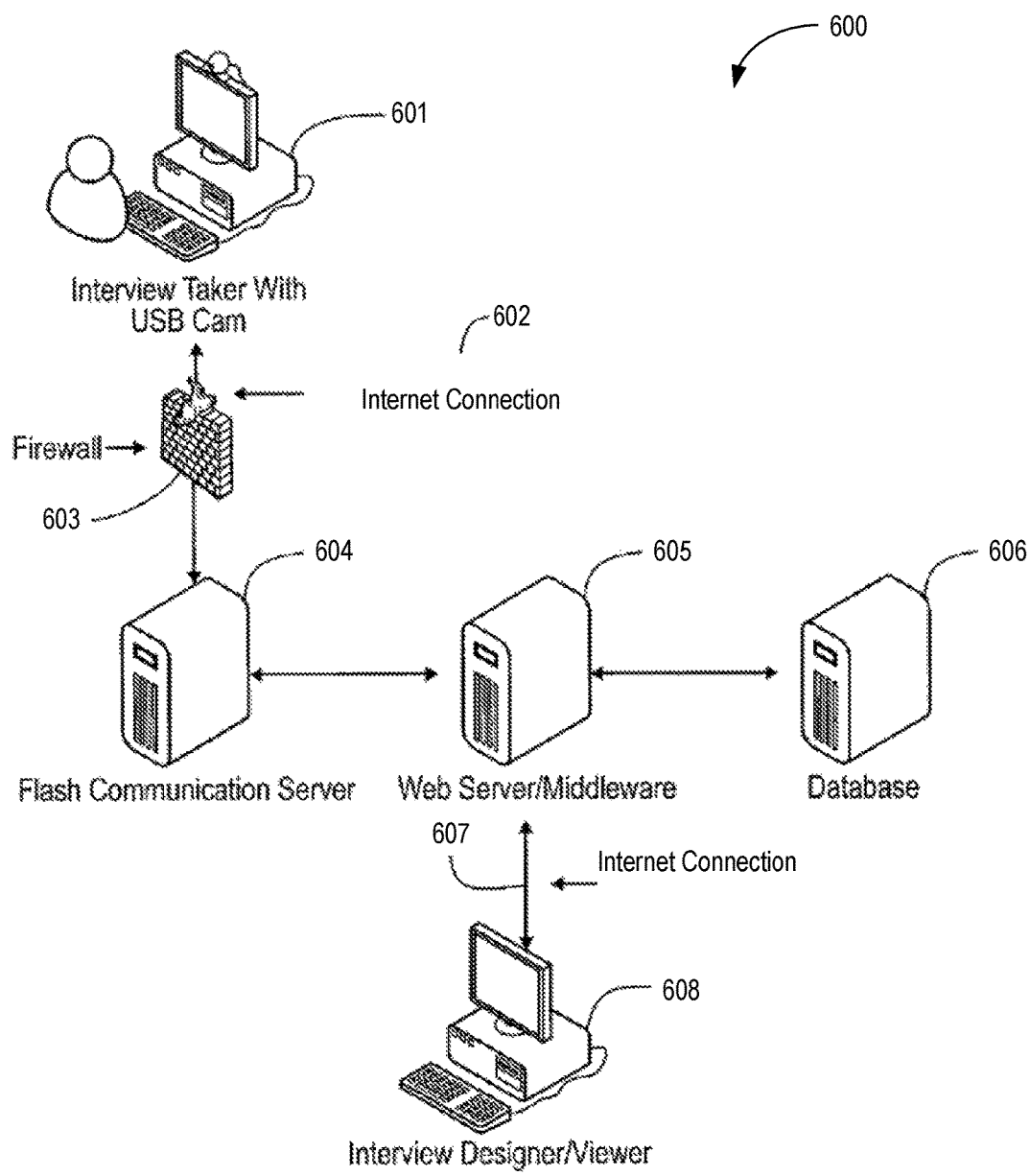
FIG. 6 illustrates a diagrammatic representation of a network architecture in which embodiments of training a predictive model may operate.

FIG. 6 is a block diagram of a network architecture 600 in which embodiments of a model training tool 110 may operate. The network architecture 600 can be used in the design of one or more digital interactions and conducting one or more of the interactions. The administrator of the digital platform can use a standard computer system 608 with an Internet connection 607 (or other network connection) to a web server 605 (also referred to as middleware server). The web server 605 includes the model training tool 110 as described herein. In this embodiment, the model training tool 110 resides on the web server 605 and the web server 605 is in communication with a database 606 (e.g., data store 130) as well as with, in this example, a communication server 604, such as a Flash communication server to facilitate communication with a user or subject such as an interviewee. The communication server 604 communicates with the interviewee typically over an Internet connection 602 (e.g., a public or private network connection). A firewall 603 may be used to protect the security of the servers 604, 605 and the database 606. The interviewee, using a computer system with a web camera 601 interfaces over the Internet connected to answer questions, upload information, and conduct one or more interviews. The computer systems used by the administrator computer 608 and the interviewer computer 601 may be various types of computers, user devices, or other types of devices that are network compatible and include a web camera, a microphone, or any combination thereof to record the digital interview. The candidate data, including the recording of the digital interview, are stored in the database 606. For example, a video file, an audio file, textual data, or any combination of the digital interview can be captured by the communication server 604 (or web server 605) and stored in the database 606.

Figure 7:
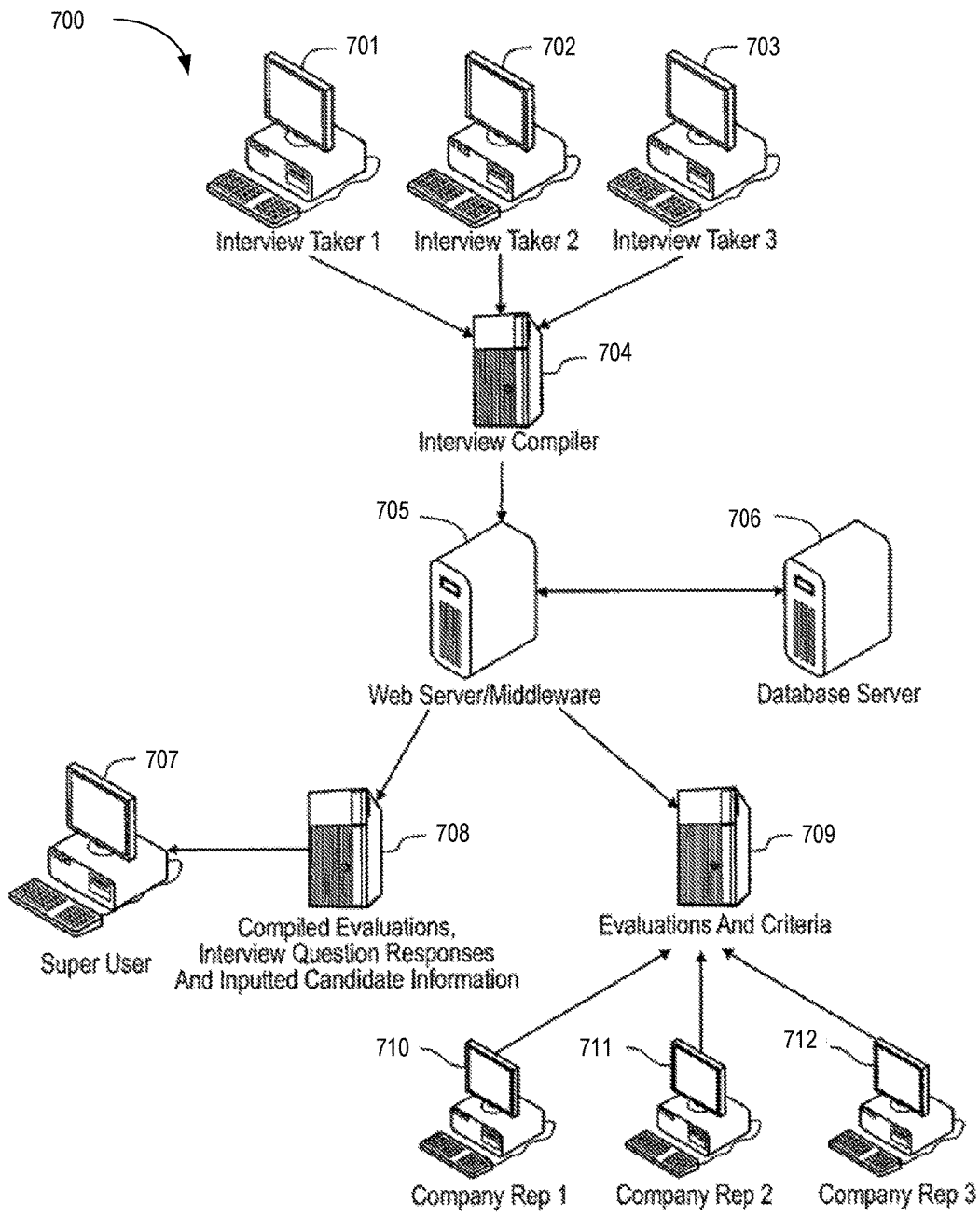
FIG. 7 illustrates a diagrammatic representation of another network architecture in which embodiments of training a predictive model may operate.

FIG. 7 is a block diagram of another network architecture 700 in which embodiments of a model training tool 110 may operate. The network configuration 600 can be used in the design of one or more digital interviews and conducting one or more interviews. In this embodiment, one or more interviewees access an interview computer 704 using networked personal computers 701, 702, 703. The interview computer 704 is connected over a network connection to a web server 705, where the model training tool 110 may reside. The web server 705 is connected to the database server 706, where the stored data resides. The web server 705 can be accessed by an administrator (or super user), using a personal computer 707 that is connected to a storage server 708, which can store such information as compiled evaluations, interview question responses and inputted candidate (interviewee) information. One or more reviewers, using networked personal computers 710, 711, 712 can be connected to an evaluation storage server 709, which can store information on evaluations and criteria in the interview processes described herein. The model training tool 110 may reside in the web server 705 or the evaluation storage server 709 to monitor for and correct adverse impact in the decision-making process as described above.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "communicating," "capturing," "executing," "defining," "specifying," "creating," "recreating," "processing," "providing," "computing," "calculating," "determining," "displaying," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:
collecting, by a processing device, digital interview data from candidate interviews on a digital interview platform;
selecting, by a model training tool executed by the processing device, a data set of the digital interview data for use in training a predictive model, wherein the data set comprises a predicted performance outcome and an actual performance outcome for each of a plurality of candidates;
determining, by the model training tool using an objective function that employs a machine learning scheme, an error metric for each of the plurality of candidates, wherein the error metric comprises a relationship between the predicted performance outcome and the actual performance outcome for each of the plurality of candidates;
detecting, by the model training tool, multiple features in the digital interview data for a number of candidates, wherein at least a first feature and a second feature of the multiple features correspond to a protected class and comprise one of an audio feature, a video feature, or an image feature derived from raw audio-video content of the digital interview data;
generating a set of normalized error metrics for the plurality of candidates by normalizing, with the model training tool, an effect of the first feature for each type or class of the plurality of candidates on each respective error metric; and
applying, by the model training tool in further training of the predictive model using the machine learning scheme, the set of normalized error metrics to reduce adverse impact in the predictive model with respect to the protected class.

2. The method of claim 1, further comprising:
determining a penalty value from a penalty function operating based on an applicable rule; and
generating a set of updated error metrics by updating, using the penalty value, each error metric for at least some of the plurality of candidates;
wherein generating the set of normalized error metrics is performed on the set of updated error metrics.

3. The method of claim 2, wherein the determining the penalty value from the penalty function comprises at least one of:
determining the penalty value using a ⅘ths rule;
determining the penalty value using a statistical significance rule;
determining the penalty value using a Fisher's exact test;

determining the penalty value using a z-test for proportions; or determining the penalty value using a chi-squared test.

4. The method of claim 1, wherein the objective function comprises a sum of squared errors operation.

5. The method of claim 1, wherein the detecting the first feature in the digital interview data for the number of candidates comprises determining a feature corresponding to at least one of age, gender, sexual orientation, disability, or race.

6. The method of claim 1, further comprising:

generating a set of corrected error metrics by removing, from the set of normalized error metrics, the second feature of the multiple features in response to a determination that the second feature contributes to at least a portion of the adverse impact to at least some of the plurality of candidates; and applying, in further training of the predictive model, the set of corrected error metrics to further reduce the adverse impact in the predictive model with respect to the protected class.

7. A method comprising:

collecting, by a processing device, digital interview data comprising features identified from candidate interviews;

selecting, by a model training tool executing on the processing device, a data set of the digital interview data for use in training a predictive model, wherein the data set comprises a predicted performance outcome and an actual performance outcome for each of a plurality of candidates;

determining, by the model training tool using an objective function that employs a machine learning scheme, an error metric for each of the plurality of candidates, wherein the error metric comprises a relationship between the predicted performance outcome and the actual performance outcome for each of the plurality of candidates;

detecting, by the model training tool, multiple features in the digital interview data for a number of candidates, wherein at least a first feature and a second feature of the multiple features correspond to a protected class and comprise one of an audio feature, a video feature, or an image feature derived from raw audio-video content of the digital interview data;

generating a set of normalized error metrics for the plurality of candidates by normalizing, with the model training tool, an effect of the first feature for each type or class of the plurality of candidates on each respective error metric; and applying, by the model training tool in further training of the predictive model using the machine learning scheme, the set of normalized error metrics to reduce adverse impact in the predictive model with respect to the protected class.

8. The method of claim 7, wherein the determining the error metric further comprises:

determining a penalty value based on a penalty function operating based on an applicable rule; and generating a set of updated error metrics by updating, using the penalty value, each error metric for at least some of the plurality of candidates; wherein generating the set of normalized error metrics k performed on the set of updated error metrics.

9. The method of claim 8, wherein the penalty function comprises a 4/5ths rule.

10. The method of claim 8, wherein the penalty function comprises a statistical significance rule.

11. The method of claim 7, wherein the objective function comprises a sum of squared errors operation.

12. The method of claim 7, wherein the detecting the first feature in the digital interview data for the number of candidates comprises determining a feature corresponding to at least one of age, gender, sexual orientation, disability, or race.

13. The method of claim 7, further comprising:

generating a set of corrected error metrics by removing, from the set of normalized error metrics, the second feature of the multiple features in response to a determination that the second feature contributes to at least a portion of the adverse impact to at least some of the plurality of candidates; and applying, in further training of the predictive model, the set of corrected error metrics to further reduce the adverse impact in the predictive model with respect to the protected class.

14. A non-transitory computer readable storage medium including instructions that, when executed by a processing device of a computing system, cause the computing system to perform operations comprising:

collecting, by a processing device, digital interview data from candidate interviews on a digital interview platform;

selecting, by a model training tool executed by the processing device, a data set of the digital interview data for use in training a predictive model, wherein the data set comprises a predicted performance outcome and an actual performance outcome for each of a plurality of candidates;

determining, by the model training tool using an objective function that employs a machine learning scheme, an error metric for each of the plurality of candidates, wherein the error metric comprises a relationship between the predicted performance outcome and the actual performance outcome for each of the plurality of candidates;

detecting, by the model training tool, multiple features in the digital interview data for a number of candidates, wherein at least a first feature and a second feature of the multiple features correspond to a protected class and comprise one of an audio feature, a video feature, or an image feature derived from raw audio-video content of the digital interview data;

generating a set of normalized error metrics for the plurality of candidates by normalizing, with the model training tool, an effect of the first feature for each type or class of the plurality of candidates on each respective error metric; and applying, by the model training tool in further training of the predictive model using the machine learning scheme, the set of normalized error metrics to reduce adverse impact in the predictive model with respect to the protected class.

15. The non-transitory computer readable storage medium of claim 14, wherein the error metric is modified by a penalty function, and wherein the penalty function comprises a function to incorporate a 4/5ths rule into the error metric.

16. The non-transitory computer readable storage medium of claim 14, wherein the operations further comprise:

generating a set of corrected error metrics by removing, from the set of normalized error metrics, the second feature of the multiple features in response to a determination that the second feature contributes at least a portion of the adverse impact to at least some of the plurality of candidates; and applying, in further training of the predictive model, the set of corrected error metrics to further reduce the adverse impact in the predictive model with respect to the protected class.

17. A computing system comprising:

a data storage device; and a processing device, coupled to the data storage device, to execute a digital interviewing platform comprising a model training tool, wherein the model training tool is to:

collect digital interview data comprising features identified from candidate interviews;

select a data set of the digital interview data for use in training a predictive model, wherein the data set comprises a predicted performance outcome and an actual performance outcome for each of a plurality of candidates;

determine, using an objective function that employs a machine learning scheme, an error metric for each of the plurality of candidates, wherein the error metric comprises a relationship between the predicted performance outcome and the actual performance outcome for each of the plurality of candidates;

detect multiple features in the digital interview data for a number of candidates, wherein at least a first feature and a second feature of the multiple features correspond to a protected class and comprise one of an audio feature, a video feature, or an image feature derived from raw audio-video content of the digital interview data;

generate a set of normalized error metrics for the plurality of candidates via normalization of an effect of the first feature for each type or class of the plurality of candidates on each respective error metric; and apply, in further training of the predictive model using the machine learning scheme, the set of normalized error metrics to reduce adverse impact in the predictive model with respect to the protected class.

18. The computing system of claim 17, wherein the digital interviewing platform is a web-based application.

19. The computing system of claim 17, wherein the model training tool is further to determine a penalty value based on a penalty function to determine the error metric, wherein the penalty function comprises a ⅘ths rule.

20. The computing system of claim 17, wherein the processing device is further executing the model training tool to:

generate a set of corrected error metrics via removal, from the set of normalized error metrics, of the second feature of the multiple features in response to a determination that the second feature contributes at least a portion of the adverse impact to at least some of the plurality of candidates; and apply, in further training of the predictive model, the set of corrected error metrics to further reduce the adverse impact in the predictive model with respect to the protected class.

* * * * *